US009415697B2

(12) United States Patent
Asai

(10) Patent No.: US 9,415,697 B2
(45) Date of Patent: Aug. 16, 2016

(54) CONTACTLESS POWER SUPPLY SYSTEM

(71) Applicant: NISSAN MOTOR CO., LTD., Yokohama-shi, Kanagawa (JP)

(72) Inventor: Akihiro Asai, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/783,842

(22) PCT Filed: Mar. 20, 2014

(86) PCT No.: PCT/JP2014/057775
§ 371 (c)(1),
(2) Date: Oct. 9, 2015

(87) PCT Pub. No.: WO2014/167978
PCT Pub. Date: Oct. 16, 2014

(65) Prior Publication Data
US 2016/0052408 A1  Feb. 25, 2016

(30) Foreign Application Priority Data

Apr. 12, 2013  (JP) .................................. 2013-083544

(51) Int. Cl.
*B60K 1/04* (2006.01)
*B60L 11/18* (2006.01)
(Continued)

(52) U.S. Cl.
CPC ................ *B60L 11/182* (2013.01); *B60K 1/04* (2013.01); *B60L 11/1877* (2013.01); *B60L 11/1879* (2013.01); *B60R 16/02* (2013.01);
(Continued)

(58) Field of Classification Search
None
See application file for complete search history.

(56) References Cited

U.S. PATENT DOCUMENTS 8,833,533 B2 *  9/2014  Suh .................... B60L 11/007
104/281
8,981,717 B2 *  3/2015  Hayashi ................ B60L 3/12
180/65.1
(Continued)

FOREIGN PATENT DOCUMENTS

JP  10-109548 A  4/1998
JP  2011-020627 A  2/2011
(Continued)

OTHER PUBLICATIONS

Schrieber, H. et al., "Schriebers Stromkasten 104: Induktives Laden wird erforscht—autobild.de", *Autobilde.de*, www.autobild.de, Nov. 12, 2010, 4 pages.

*Primary Examiner* — John Walters
*Assistant Examiner* — Hilary L Johns
(74) *Attorney, Agent, or Firm* — Foley & Lardner LLP

(57) ABSTRACT

A contactless power supply device including: a power receiving portion (22) which is provided at the center in the vehicle width direction, of a front part of the lower surface of a floor panel (40) of a vehicle (1); a power supply portion (12) which is provided for a parking space (2) and contactlessly supplies electric power to the vehicle by magnetic connection with the power receiving portion (22); a sub-frame (51) provided in a lower part of a front compartment (1F) of the vehicle (1); a motor unit (29U) mounted on the sub-frame (51); and extension portions (53) stiffening fixed portions of the power receiving portion (22), the extension portions (53) being extended from both sides of the rear end of the sub-frame (51) in the vehicle width direction toward the back of the vehicle along both sides of the power receiving portion (22) in the vehicle width direction.

3 Claims, 9 Drawing Sheets

(51) Int. Cl.
*H02J 7/00* (2006.01)
*H02J 17/00* (2006.01)
*B60R 16/02* (2006.01)

(52) U.S. Cl.
CPC  *H02J 7/00* (2013.01); *H02J 17/00* (2013.01);
*B60K 2001/0416* (2013.01); *Y02T 10/7005*
(2013.01); *Y02T 10/7072* (2013.01); *Y02T
90/122* (2013.01); *Y02T 90/14* (2013.01)

(56) References Cited

U.S. PATENT DOCUMENTS

| | | | |
|---|---|---|---|
| 2011/0132676 A1 | 6/2011 | Kodaira | |
| 2012/0090907 A1* | 4/2012 | Storc | B60K 1/04 180/68.5 |
| 2012/0103714 A1* | 5/2012 | Choi | B60K 1/04 180/68.5 |
| 2013/0134939 A1* | 5/2013 | Sato | B60L 11/1816 320/109 |
| 2013/0300359 A1 | 11/2013 | Nakamura et al. | |
| 2014/0284125 A1* | 9/2014 | Katayama | B60K 1/04 180/68.5 |
| 2015/0249240 A1* | 9/2015 | Hihara | B60K 1/04 180/68.5 |

FOREIGN PATENT DOCUMENTS

| | | |
|---|---|---|
| JP | 2011-073582 A | 4/2011 |
| JP | 2011-152841 A | 8/2011 |
| JP | 2011-217452 A | 10/2011 |
| JP | 2012-121375 A | 6/2012 |
| WO | WO 2011/116394 A1 | 9/2011 |
| WO | WO 2012/105040 A1 | 8/2012 |

\* cited by examiner (A)

(B)

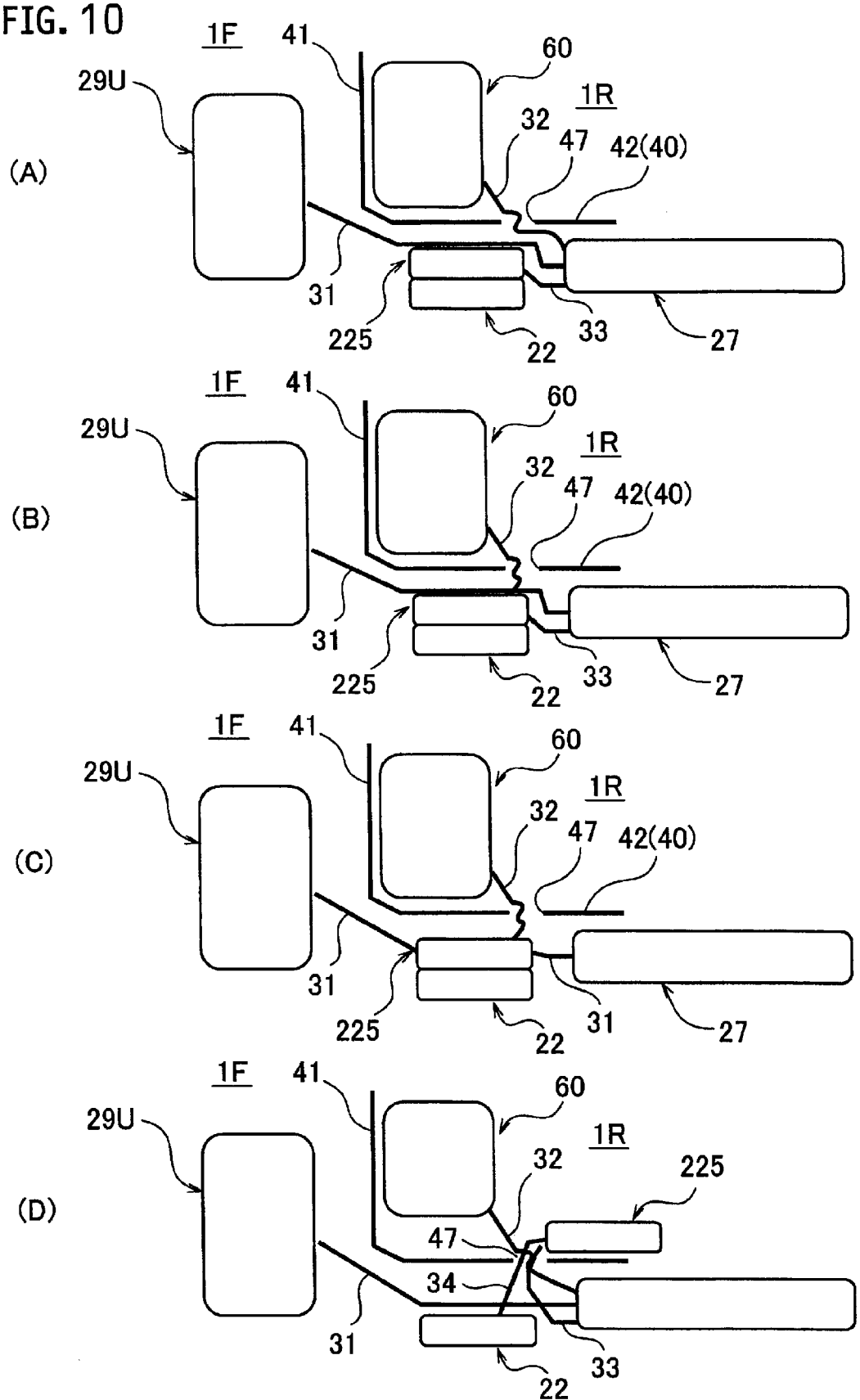

CONTACTLESS POWER SUPPLY SYSTEM

TECHNICAL FIELD

The present invention relates to a contactless power supply device which contactlessly supplies electric power to a vehicle such as an electric vehicle.

BACKGROUND ART

Patent Literature 1 discloses a technique to charge a battery mounted on the lower surface of the floor panel of a vehicle by causing a movable primary coil provided on the road to exactly face a secondary coil mounted on the vehicle and supplying electric power from the primary coil to the secondary coil by electromagnetic induction.

CITATION LIST

Patent Document

Patent Document 1: Japanese Patent Unexamined Publication No. 2011-217452

SUMMARY OF THE INVENTION

The technique disclosed in Patent Literature 1 needs a device to drive the primary coil and a drive control means including various types of detectors. The system can be therefore complicated.

Accordingly, the present invention is to provide a contactless power supply device capable of properly aligning the power receiving portion provided on the vehicle with the same feeling as driving to steer and park the vehicle to a predetermined stop position in a parking space so that the power receiving portion exactly faces the power supply portion provided on the road.

A contactless power supply device according to a first aspect of the present invention includes: a power receiving portion provided on a front part of the lower surface of a floor panel of a vehicle; and a power supply portion which is provided for a parking space and contactlessly supplies electric power to the vehicle by magnetic connection with the power receiving portion. The contactless power supply device according to the first aspect further includes: a sub-frame provided in a lower part of a front compartment of the vehicle; and extension portions stiffening fixed portions of the power receiving portion, the extension portions being extended from both sides of the rear end of the sub-frame in the vehicle width direction toward the back of the vehicle along both sides of the power receiving portion in the vehicle width direction.

BRIEF DESCRIPTION OF DRAWINGS

FIG. 10A to 10D are schematic explanatory views illustrating examples of the wiring pattern of the battery.

DESCRIPTION OF EMBODIMENTS

Hereinafter, a description is given of an embodiment of the present invention in detail with reference to the drawings. The drawings illustrated below are schematic diagrams for explaining the embodiment, and the dimensional proportions, arrangements, and the like are not exact.

Figure 1:
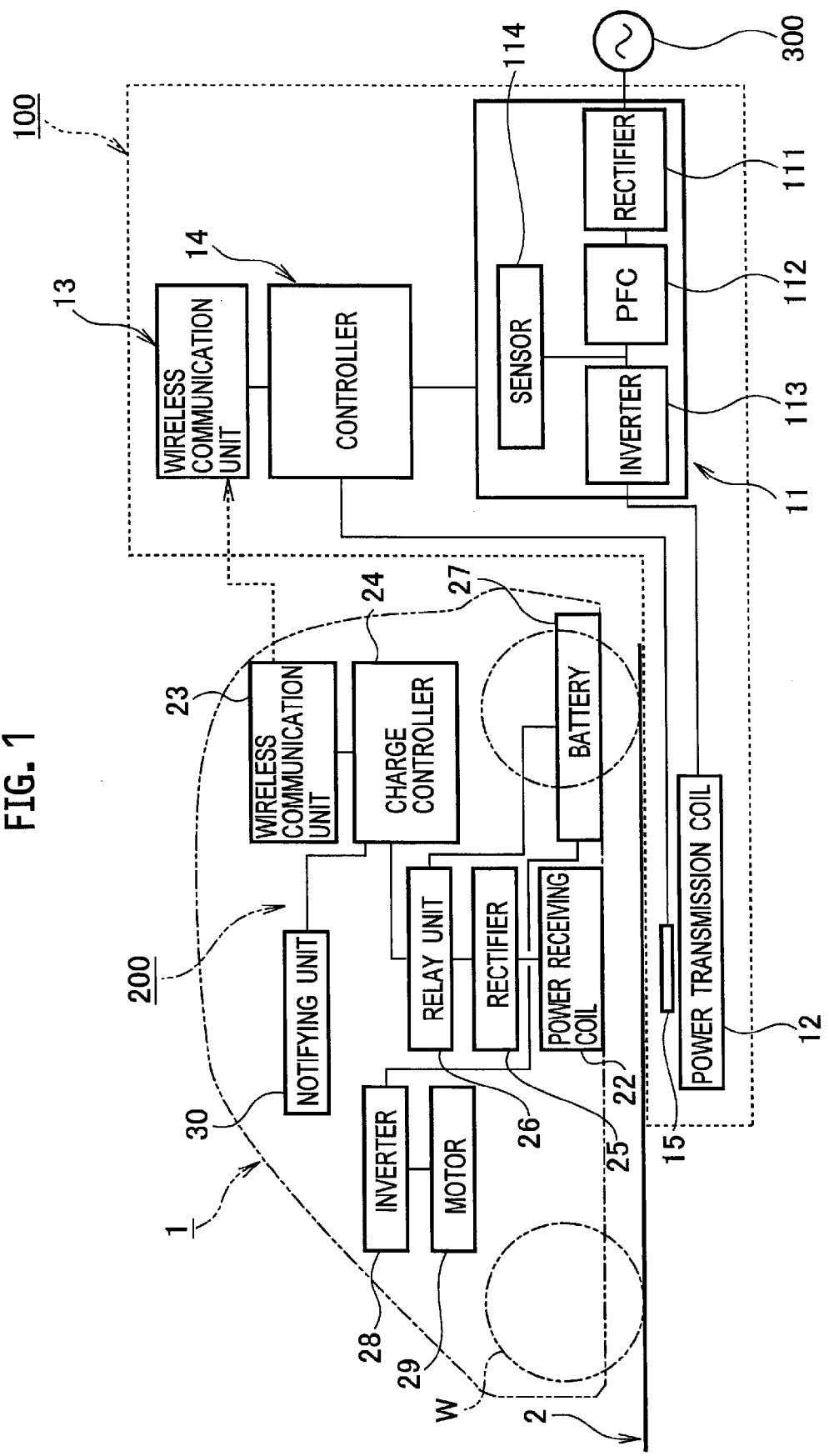
FIG. 1 is an explanatory diagram schematically illustrating a contactless power supply device according to the present invention.
Figure 2:
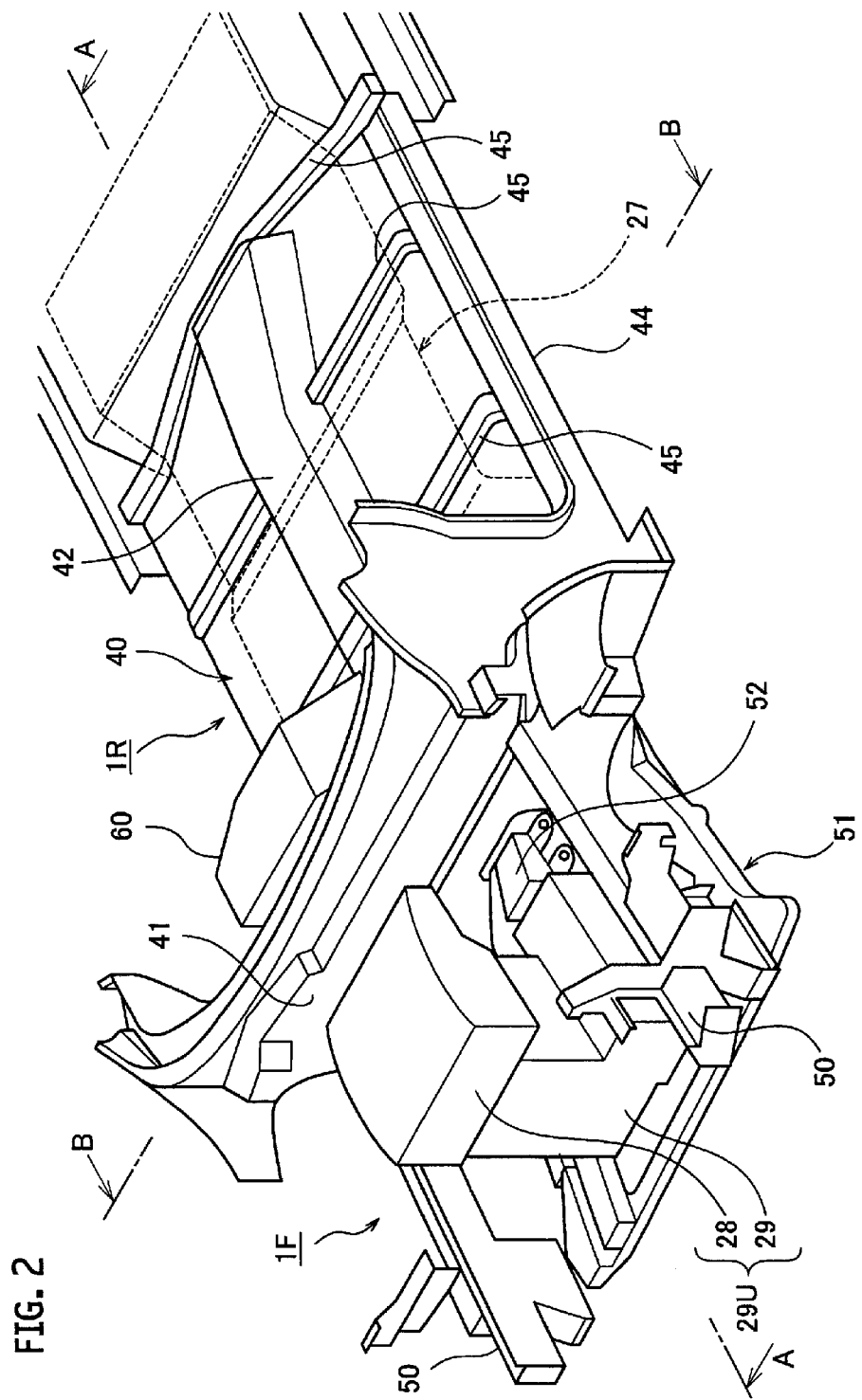
FIG. 2 is a perspective view illustrating a layout of a battery, a motor unit, and an interior auxiliary equipment which are mounted.
Figure 3:
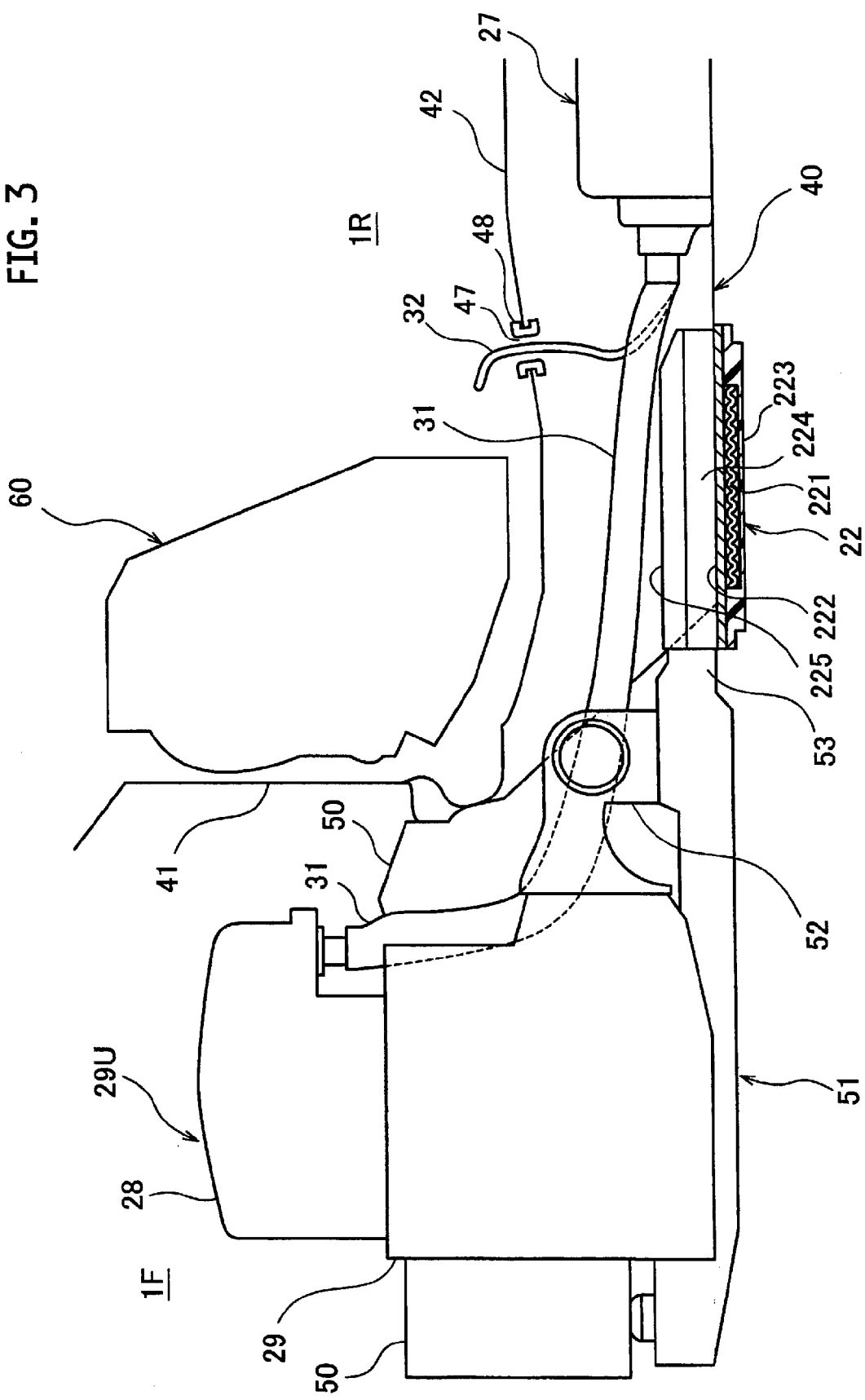
FIG. 3 is a cross-sectional view taken along a line A-A, which extends in the vehicle longitudinal direction, at the center of the vehicle of FIG. 2.

The contactless power supply device of the embodiment illustrated in FIG. 1 includes a power supply device 100 as a ground unit and a power receiving device 200 as a vehicle unit. In the contactless power supply device of the embodiment, electric power is supplied from the power supply device 100 provided for a charge stand or the like to the power receiving device 200 mounted in a vehicle 1 represented by an electric vehicle or a hybrid vehicle for charging an in-vehicle battery 27.

The contactless power supply device of the embodiment includes a power receiving portion 22 and a power supply portion 12. The power receiving portion 22 is provided at the center in the vehicle width direction, of the front part of the lower surface of a floor panel 40 of the vehicle 1. The power supply portion 12 is provided in a parking space 2 and is magnetically connected to the power receiving portion 22 to contactlessly supply electric power to the vehicle 1. The contactless power supply device of the embodiment includes a sub-frame 51 provided in a lower part of a front compartment of the vehicle 1 and a motor unit 29U mounted on the sub-frame 51. The contactless power supply device of the embodiment further includes extension portions 53 that stiffen fixed portions of the power receiving portion 22. The extension portions 53 are extended from both sides of the rear end of the sub-frame 51 in the vehicle width direction toward the back of the vehicle 1 along both sides of the power receiving portion 22 in the vehicle width direction.

The contactless power supply device of the embodiment further includes a battery 27, which is provided on the lower surface of the floor panel 40, and a wire harness which transmits electric power from the battery 27 to the motor unit 29U. The wire harness is arranged to pass over the power receiving portion 22 and extend in the vehicle longitudinal direction.

The power supply device 100 includes a power supply portion 12, which is provided in a parking space 2 near a charge stand. The power receiving device 200 includes the power receiving portion 22. The power receiving portion 22 is provided on the bottom surface of the vehicle 1 so as to face the power supply portion 12 when the vehicle 1 is parked at a predetermined position of the parking space 2. The power supply portion 12 is magnetically connected to the power receiving portion 22 to contactlessly supply electric power to a vehicle.

Specifically, the power supply portion 12 is a power transmission coil mainly composed of a primary coil made of conductive wire. The power receiving portion 22 is a power receiving coil mainly composed of a secondary coil also made of conductive wire. By using the power supply portion 12 and power receiving portion 22, electric power is supplied contactlessly from the power transmission coil 12 to power receiving coil 22 by electromagnetic induction (magnetic connection) between the coils. The power supply portion 12 thus contactlessly supplies electric power to the vehicle 1 by magnetic connection.

The power supply device 100 on the ground includes a power controller 11, the power transmission coil 12, and a wireless communication unit 13, and a controller 14.

The power controller 11 is a circuit to convert AC power transmitted from an AC power supply 300 to high-frequency AC power and transmit the high-frequency AC power to the power transmission coil 12. The power controller 11 includes a rectifier 111, a PFC circuit 112, an inverter 113, and a sensor 114. The rectifier 111 is electrically connected to the AC power supply 300 and is a circuit to rectify the AC power outputted from the AC power supply 300. The PFC circuit 112 is a circuit (Power Factor Correction) to improve the power factor by shaping the waveform of the output from the rectifier 111. The PFC circuit 112 is connected to between the rectifier 111 and inverter 113.

The wireless communication unit 13 performs two-way communication with a wireless communication unit 23 provided for the vehicle 1.

The controller 14 is a unit to control the entire power supply device 100. The controller 14 transmits through communication between the wireless communication units 13 and 23, a signal to start power supply from the power supply device 100 to the vehicle 1 and receives from the vehicle 1, a signal to request power supply from the power supply device 100.

The controller 14 controls switching of the inverter 113 based on the current detected by the sensor 114 and controls electric power transmitted from the power transmission coil 12. The controller 14 stops power supply based on detection signal from a foreign substance sensor 15 during power supply and sends a warning signal to the vehicle 1 through the wireless communication units 13 and 23.

The foreign substance sensor 15 is a metallic detection coil, for example. The foreign substance sensor 15 outputs a detection electrical signal when metallic foreign substances enter or are located in a magnetic field formed between the power transmission coil 12 and the power receiving coil 22. The detection electrical signal prompts the controller 14 to immediately issue a warning or stop power supply, thus preventing failure due to metallic foreign substances exiting in the magnetic field, such as insufficient power supply.

The power receiving device 200 of the vehicle 1 includes the power receiving coil 22, the wireless communication unit 23, a charge controller 24, a rectifier unit 25, a relay unit 26, the battery 27, an inverter 28, a motor 29, and a notifying unit 30.

The power receiving coil 22 is located just above the power transmission coil 12 with a certain distance apart so as to exactly face the power transmission coil 12 when the vehicle 1 is parked at a predetermined stop position of the parking space 2 as described below.

The rectifier unit 25 is connected to the power receiving coil 22. The rectifier unit 25 is composed of a rectifier circuit to rectify the AC power received by the power receiving coil 22 to DC power.

The relay unit 26 includes a relay switch to be turned on and off under control of the charge controller 24. When the relay switch is turned off, the relay unit 26 disconnects the main circuit system including the battery 27 from the power receiving coil 22 and rectifier unit 25 as a circuit for charging.

The battery 27 is composed of plural secondary batteries connected to one another. The battery 27 serves as a power source of the vehicle 1. The inverter 28 is a control circuit, such as a PWM controller, including a switching device such as an IGBT. The inverter 28 converts the DC power outputted from the battery 27 to AC power based on switching control signal and supplies the AC power to the motor 29. The motor 29 is composed of a three-phase AC motor, for example. The motor 29 serves as a driving source for driving the vehicle 1.

The notifying unit 30 is composed of a warning lamp, a navigation system display, a speaker, and the like. The notifying unit 30 outputs light, images, sound, or the like to the user under the control by the charge controller 24.

The charge controller 24 is a controller to control charge of the battery 27. The charge controller 24 controls the wireless communication unit 23, notifying unit 30, relay unit 26, and the like. The charge controller 24 sends a signal indicating the start of charge to the controller 14 by communication between the wireless communication units 23 and 13. The charge controller 24 is connected to a not-shown controller controlling the entire vehicle 1 through a CAN communication network. The controller is configured to control switching of the inverter 28 and manages the state of charge (SOC) of the battery 27. The charge controller 24 sends a signal indicating the termination of charge to the controller 14 when the controller determines based on the SOC of the battery 27 that the battery 27 is fully charged.

In the contactless power supply device of the embodiment, high-frequency power is contactlessly exchanged between the power transmission coil 12 and the power receiving coil 22 by electromagnetic induction. In other words, when voltage is applied to the power transmission coil 12, magnetic connection between the power transmission coil 12 and the power receiving coil 22 causes electric power to be supplied from the power transmission coil 12 to the power receiving coil 22.

Protective casing surfaces of the aforementioned power transmission coil 12 and the aforementioned power receiving coil 22 which face each other are located in the electromagnetic induction range and are therefore composed of synthetic resin materials so as not to prevent the electromagnetic induction.

FIGS. 2 to 10 are diagrams illustrating the aforementioned power receiving coil 22 and battery 27 mounted on the vehicle 1.

The power receiving coil 22 and battery 27 are provided on the lower surface of the floor panel 40 of the vehicle 1.

The power receiving coil 22 is provided at the center in the vehicle width direction, of the front end of the lower surface of the floor panel 40 of the vehicle 1. Herein, the center in the vehicle width direction refers to an idea indicating the center in the vehicle width direction and a part therearound. The battery 27 is mounted so as to occupy a wide area from the position near the part where the power receiving coil 22 is located toward the back of the vehicle 1.

The front end of the floor panel 40 is joined to a dash panel 41, which partitions a front compartment 1F from a passenger compartment 1R. At the center of the floor panel 40 in the vehicle width direction (the center of the vehicle 1), a tunnel portion 42 is provided. The tunnel portion 42 bulges into the passenger compartment 1R and extends in the vehicle longitudinal direction (see FIGS. 2 and 3).

In the bulge base portions on both sides of the tunnel portion 42, stiffening portions 43 are formed. Each of the stiffening portions 43 has a closed cross section and extends in the vehicle longitudinal direction along any one of the base portions of the bulge.

The floor panel 40 ensures required floor rigidity by the tunnel portion 42, stiffening portions 43, and floor frame members. The floor frame members include side sills 44, plural cross members 45, outriggers 46, and the like (see FIGS. 2 to 4). The side sills 44 are provided on both sides in the vehicle width direction to extend in the vehicle longitudinal direction. The cross members 45 are extended in the vehicle width direction. The outriggers 46 links the reinforcement portion 43 to the respective side sills 44 close to the same in the floor front part.

The battery 27, which is large and heavy, is firmly fastened and fixed to the main frame members including the side sills 44 and cross members 45 and the stiffening portions 43 of the tunnel portion 42.

Figure 4:
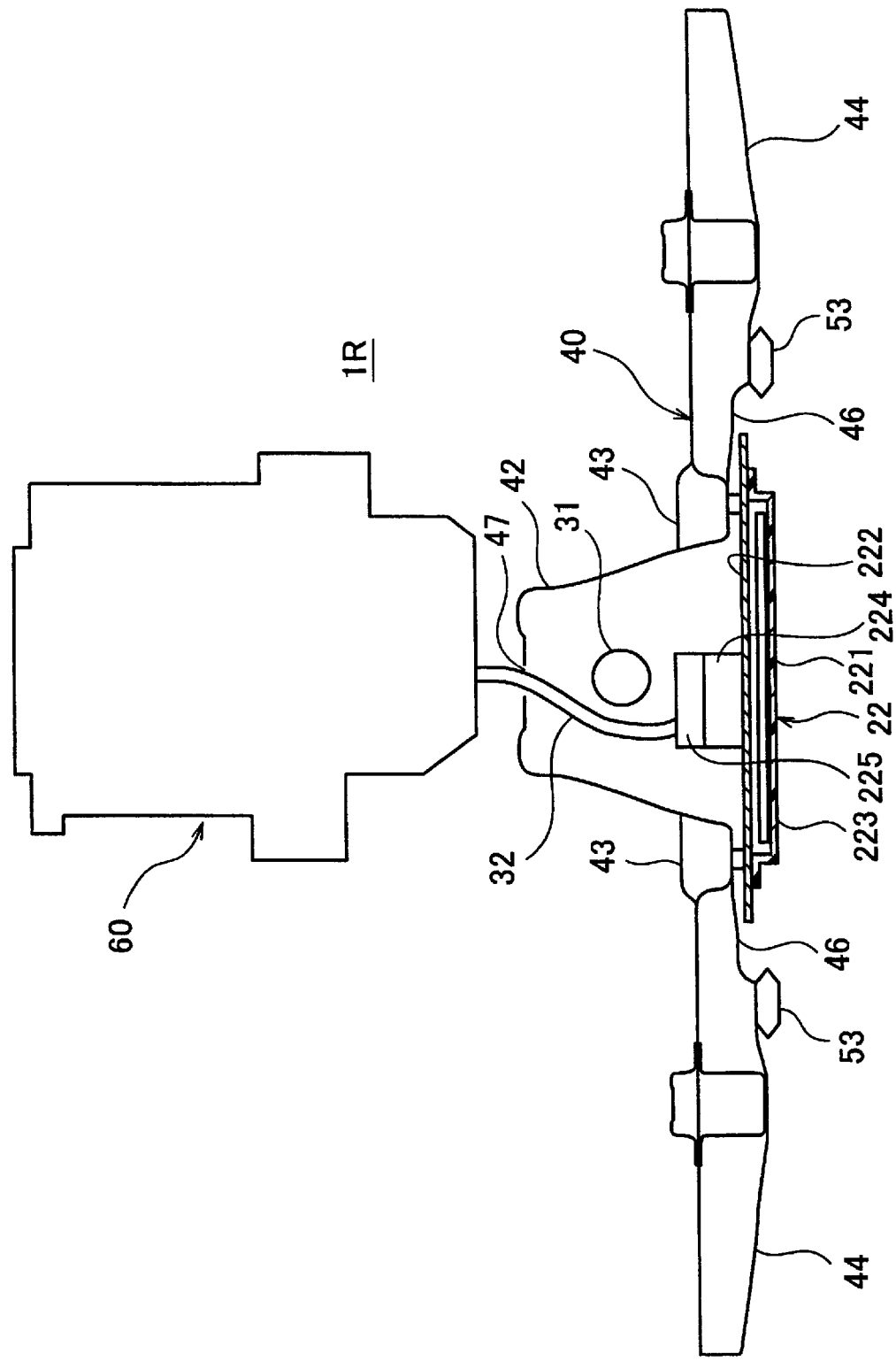
FIG. 4 is a cross-sectional view taken along a line B-B, which extends in the vehicle width direction, in a part including a power receiving portion of FIG. 2.
Figure 5:
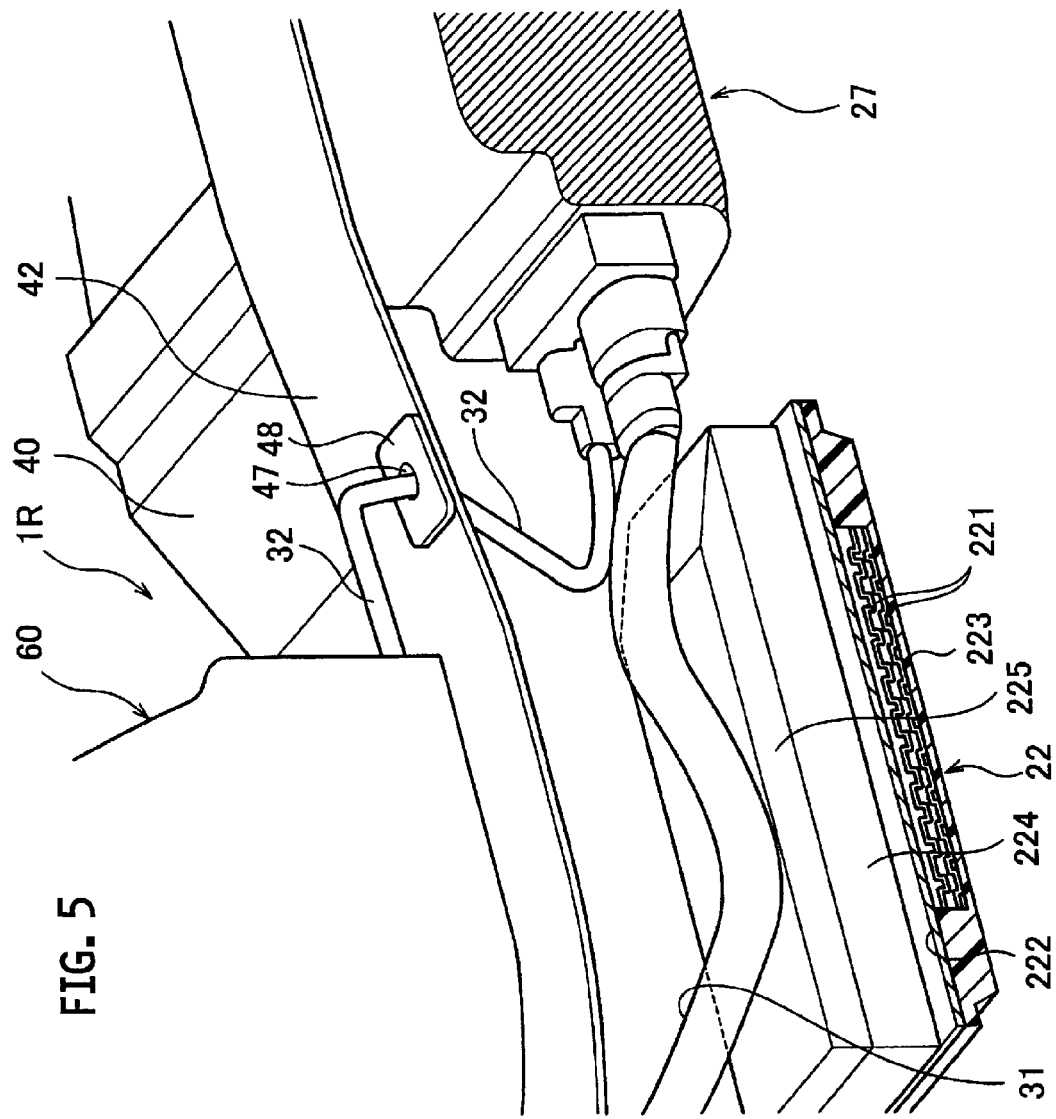
FIG. 5 is a perspective view of the cross section illustrating an arrangement of the power receiving portion in a tunnel portion.
Figure 6:
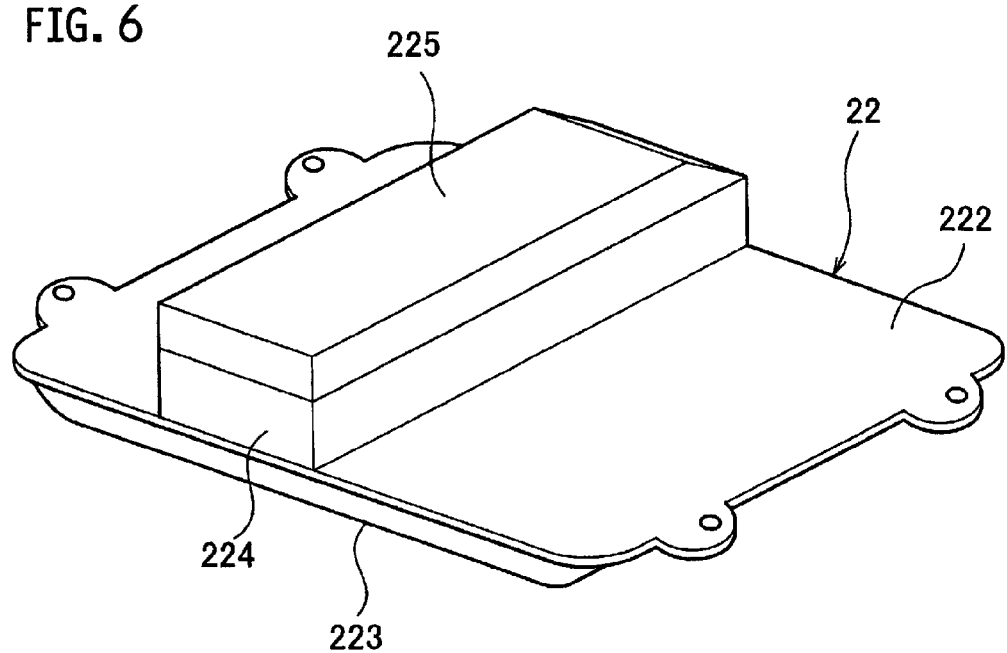
FIG. 6 is a perspective view of the power receiving portion.

On the other hand, the power receiving coil 22 is joined to the aforementioned mount setting position, that is, the central position in the vehicle width direction, of the front end of the lower surface of the floor panel 40 so as to be arranged across the open bottom part of the tunnel portion 42 (see FIG. 4).

The power receiving coil 22 has a width dimension W2 in the vehicle width direction which is set larger than a width dimension W1 of the open bottom part of the tunnel portion 42 (W1<W2). The power receiving coil 22 is thus joined to be laid across the stiffening portions 43, 43 of the open bottom part of the tunnel portion 42, or across the outriggers 46, 46.

The power receiving coil 22 includes: a coil body 221 for receiving electric power; a protective casing 222 which houses and fixes the coil body 221 and is made of a non-magnetic metal, such as aluminum; and a lid 223 that closes the open bottom part of the protective casing 222. The power receiving coil 22 has a rectangular plate shape. The lid 223 is made of a proper synthetic resin so as not to prevent electro-magnetic induction between the power transmission coil 12 and the power receiving coil 22 (see FIGS. 5 and 6).

At the center of the upper surface of the protective casing 222, a junction box 225 is provided. The junction box 225 houses a switch board (a distribution device), a relay (the relay unit 26), a controller (the charge controller 24), and the like. In the example illustrated in FIGS. 5 and 6, an electric component box 224 is provided at the center of the upper surface of the protective casing 222. The electric component box 224 houses electric components including rectifiers (the rectifier unit 25) and capacitors. The junction box 225 is composed of a different body from the electric component box 224 and has a same projected area as that of the electric component box 224. The junction box 225 is detachably assembled on the electric component box 224.

The electric component box 224 is integrally formed with the protective casing 222, the inside of which is separated by a partition plate from a part housing the coil body 221. The electric component box 224 can be composed of a different body from the protective casing 222.

On both sides of the front compartment 1F in the vehicle width direction, front side members 50 are provided, the rear end of which is joined to the dash panel 41. The front side members 50 extend in the vehicle longitudinal direction to constitute frame members of the front part of the vehicle body.

In the lower part of the front compartment 1F, the sub-frame 51 is provided. On the sub-frame 51, the motor unit 29U, which is composed of the inverter 28 and motor 29, is mounted and fixed with a mounting member 52 interposed therebetween. The sub-frame 51 thus supports the motor unit 29U mounted thereon.

The sub-frame 51 is substantially rectangular in a plan view. The front and rear ends of the sub-frame 51 at both sides in the vehicle width direction are joined to the front and rear ends of the lower surfaces of the right and left front side members 50, so that the sub-frame 51 constitutes the vehicle body frame member in the lower part of the front compartment 1F.

Figure 7:
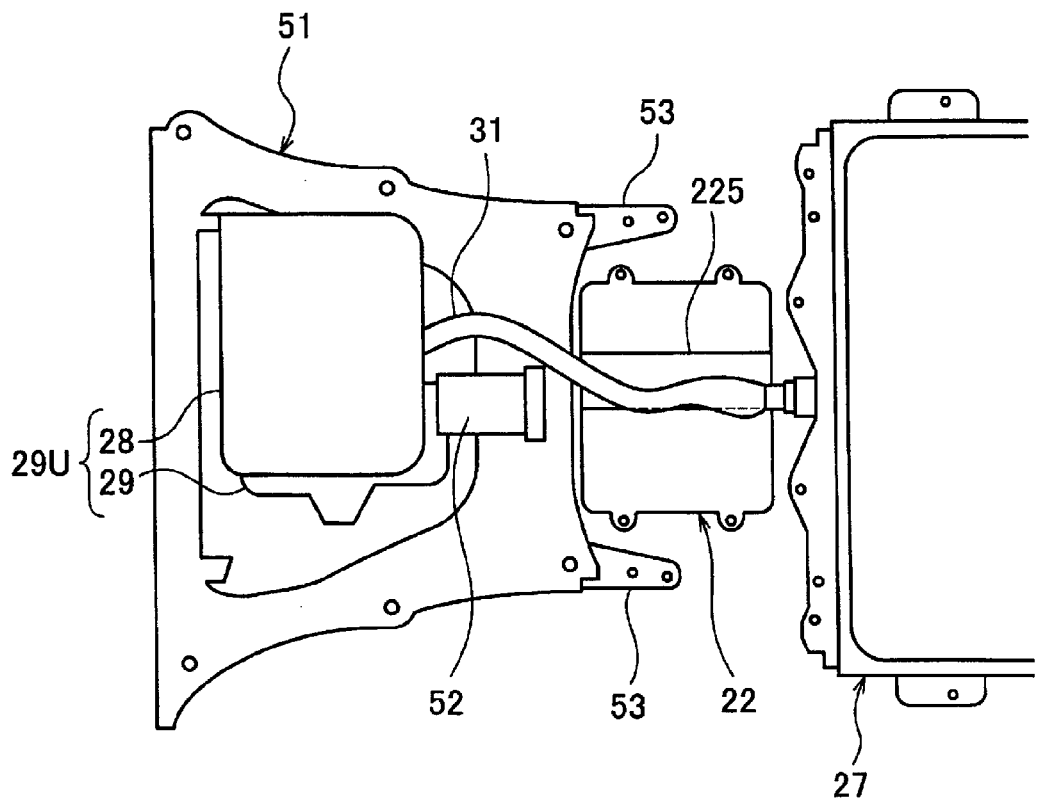
FIG. 7 is a plan view illustrating a layout of the battery, power receiving portion, and motor unit which are mounted.
Figure 8:
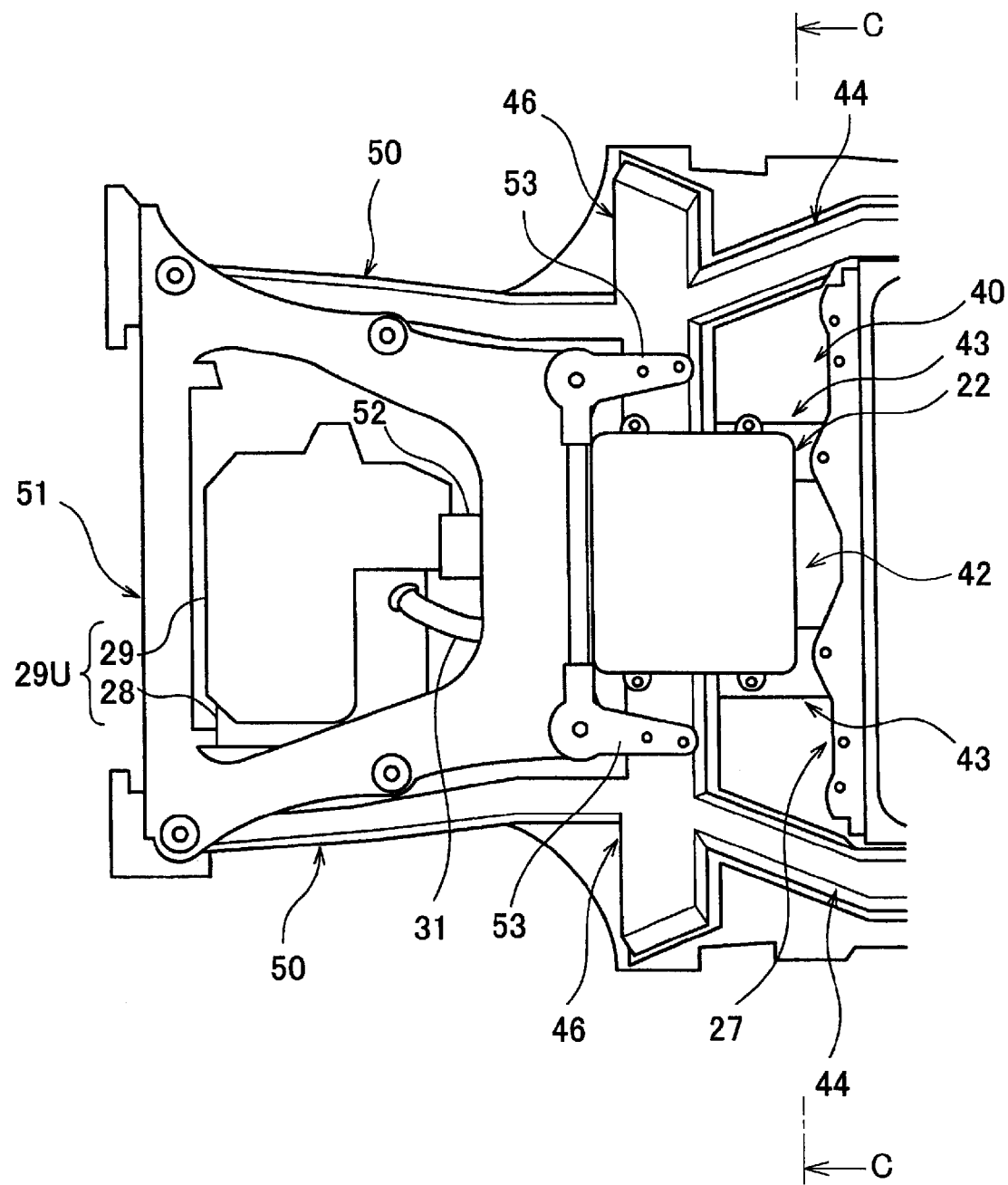
FIG. 8 is a bottom view of the layout of FIG. 7 from the bottom of the vehicle.
Figure 9:
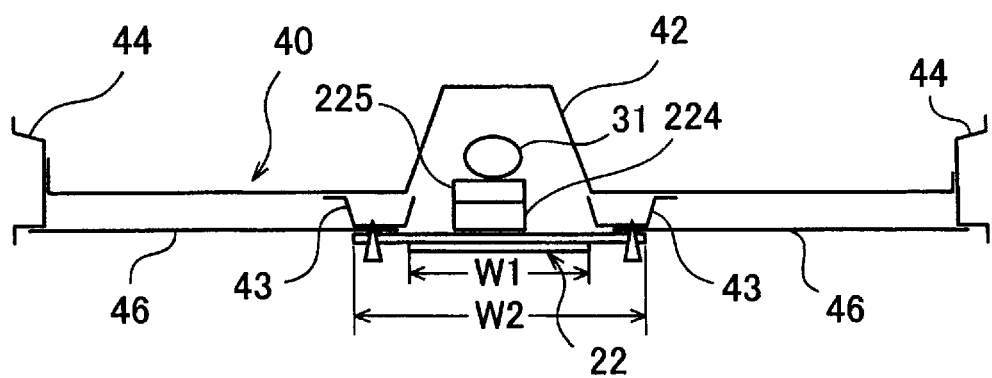
FIGS. 9A and 9B are cross-sectional views taken along a line C-C of FIG. 8, illustrating mounting examples of the power receiving portion.
Figure 9:
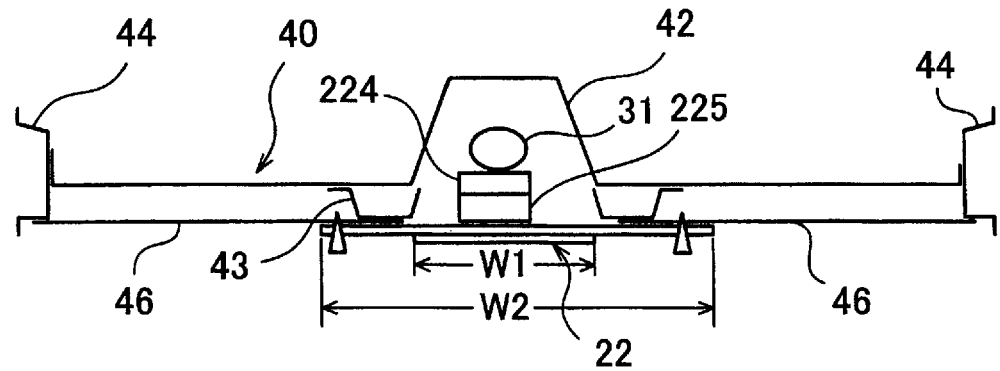

On both sides of the rear end of the sub-frame 51 in the vehicle width direction, extension portions 53, which stiffen the fixed portion of the power receiving portion 22, is provided (see FIGS. 7 and 8). The extension portions 53 are extended from both sides of the rear end of the sub-frame 51 in the vehicle width direction toward the back of the vehicle along both sides of the power receiving portion 22 in the vehicle width direction. In the illustrated examples, the extension portions 53 are extensions which are provided at both ends of a base toward the back of the vehicle and are composed of different bodies from the base. The base is columnar and extends in the vehicle width direction. The base of the extension portions 53 are fastened and fixed together with the rear end of the sub-frame 51, and the rear ends of the extension portions 53 are joined to the respective outriggers 46. The extension portions 53 may be integrally formed with the sub-frame 51.

The battery 27, power receiving coil 22, and motor unit 29U are laid out so as to be arranged in line extending in the vehicle longitudinal direction. The front end of the battery 27, which is mounted on the lower surface of the floor panel 40 of the vehicle 1, and the rear end of the motor unit 29U (the rear end of the inverter 28) are connected to a wire harness 31 of a high voltage system, which transmits electric power from the battery 27 to the motor unit 29U, with respective connectors. The wire harness 31 is arranged to pass over the power receiving coil 22 and extend along the inside of the tunnel portion 42 in the vehicle longitudinal direction.

The wire harness 31 is arranged over the junction box 225 but may be arranged beside the junction box 225 if necessary. In this case, it is preferable that the electric component box 224 and the junction box 225 are located off the central position of the tunnel portion 42 in the vehicle width direction to keep the wiring space of the wire harness 31 of a large diameter.

In the top wall of the tunnel portion 42, a through hole 47 is provided in the vicinity of the junction box 225. The through hole 47 is configured so that a wire harness 32 of a high voltage system, which transmits electric power from the battery 27 or junction box 225 to an interior auxiliary equipment 60, such as an air conditioning unit, mounted in the passenger compartment 1R and the like, is arranged to be inserted therethrough. A grommet 48 is fitted to the through hole 47 to seal the inserted portion of the wire harness.

FIGS. 10A to 10D illustrate various types of examples of power transmission wiring patterns between the battery 27 and the motor unit 29U and interior auxiliary equipment 60.

In the example illustrated in FIG. 10A, the battery 27 is connected to the motor unit 29U through the wire harness 31, connected to the interior auxiliary equipment 60 through the wire harness 32, and connected to the junction box 225 through a wire harness 33.

In the example illustrated in FIG. 10B, the junction box 225 is connected to the interior auxiliary equipment 60 through the wire harness 32. This example differs from that illustrated in FIG. 10A in that the wire harness 32 is branched off at the junction box 225 to be connected to the interior auxiliary equipment 60. In this example, the number of wires from the battery 27 is one less than that in the example of FIG. 10A.

In the example illustrated in FIG. 10C, the battery 27 and junction box 225 and the junction box 225 and motor unit 29U are connected to each other by the wire harness 31. This example differs from the example in FIG. 10B in that the wire harness 31 is divided at the junction box 225 for wiring. Compared with the example of FIG. 10B, the example of FIG. 10C does not include the wire harness 33, the number of wires connected to the battery 27 is two less than that of FIG. 10B.

In the example illustrated in FIG. 10D, the junction box 225 is separated from the power receiving coil 22 and is mounted in the passenger compartment, so that the tunnel portion 42 includes wider space. In this example, the power receiving coil 22 is connected to the junction box 225, which is separated from the power receiving coil 22, through a wire harness 34. In this example, moreover, the wire harness 33 in FIG. 10A and the newly provided wire harness 34 are inserted through the aforementioned through hole 47 together with the wire harness 32 for wiring.

According to the contactless power supply device of the embodiment which is configured as described above, the power receiving coil 22 is mounted at the center in the vehicle width direction, of the front end of the lower surface of the floor panel 40 near front wheels W which are driven. Accordingly, when the vehicle 1 is steered to be parked at a predetermined stop position in the parking space 2 so that the center of the vehicle 1 is aligned with the power transmission coil 12 on the road, the power receiving coil 22 can be properly aligned so as to exactly face the power transmission coil 12. Moreover, since the power receiving coil 22 is provided near the front wheels W, which are driven, the position of the power receiving coil 22 is finely adjusted so as to correspond to the power transmission coil 12. Accordingly, the power-receiving coil 22 can be more properly aligned to exactly face the power transmission coil 12.

According to the contactless power supply device of the embodiment, it is unnecessary to provide a dedicated drive control system which is configured to move the power transmission coil 12 using a driving mechanism for the aforementioned alignment. According to the contactless power supply device of the embodiment, the power receiving coil 22 can be aligned with the power transmission coil 12 so as to exactly face the power transmission coil 12 with a cost advantage and easy driving operation for the vehicle 1.

The power receiving coil 22 covers the lower half of the wire harness 31 of the high voltage system which transmits electric power from the battery 27 on the lower surface of the floor panel 40 to the motor unit 29U of the front compartment 1F and serves as a protector of the wire harness 31. This can increase the safety of the wire harness 31.

Moreover, the power receiving coil 22 is located at the center of the vehicle, and the battery 27, power receiving coil 22, and motor unit 29U are laid out so as to be mounted in line in the vehicle longitudinal direction. The aforementioned wire harness 31 is arranged to pass over the thus-configured power receiving coil 22 and extend in the vehicle longitudinal direction. Accordingly, the wire harness 31 is linearly arranged in a plan view, and the length thereof can be shortened.

On the aforementioned floor panel 40, the tunnel portion 42 is formed at the vehicle's center (the center in the vehicle width direction). The aforementioned power receiving coil 22 is provided across the open bottom part of the tunnel portion 42, and the wire harness 31 is arranged along the inside of the tunnel portion 42.

Moreover, the coil body 221 is housed between the aforementioned metallic protective casing 222 and synthetic resin lid 223, so that the power receiving coil 22 has a rectangular plate-shaped rigid structure. The power receiving coil 22 therefore increases the rigidity of the open bottom part of the tunnel portion 42 to exert the function of preventing the tunnel portion 42 from deforming and opening (preventing the open bottom part from widening). Furthermore, the wire harness 31 is housed in a portion having a closed cross-section formed by the power receiving coil 22 and tunnel portion 42. This further increases the safety of the wire harness 31.

The power receiving coil 22 is provided with the junction box 225 on the upper surface thereof. The power receiving coil 22 is arranged across the open bottom part of the tunnel portion 42 as described above, and the junction box 225 is located within the tunnel portion 42. This increases the safety of the junction box 225.

Furthermore, the junction box 225, which protrudes on the upper surface of the power receiving coil 22, is located within the tunnel portion 42. This prevents an increase in height of the floor panel 40 above the ground level. This provides a design advantage for modeling of the vehicle body.

The junction box 225 is composed of a different body from the power receiving coil 22 and is detachably assembled to the upper surface of the power receiving coil 22. The junction box 225 can be detached and mounted in the passenger compartment as illustrated in FIG. 10D depending on the specification. In the specifications of hybrid vehicles especially, the exhaust pipe can be longitudinally extended within the tunnel unit 42, so that the structure of the lower part of the vehicle body can be shared.

The tunnel portion 42 is provided with the through hole 47 on the top wall thereof. This can minimize the wiring length of the wire harness 32, which transmits electric power from the battery. 27 or junction box 225 to the interior auxiliary equipment 60 mounted in the passenger compartment 1R, thus increasing the flexibility of the wiring layout.

The tunnel portion 42 is provided with the stiffening portions 43, which has a closed cross section and extends in the vehicle longitudinal direction along the bulge base portions on both sides, and the power receiving coil 22 is mounted thereon across the stiffening portions 43. This can increase both attachment rigidity of the power receiving coil 22 and rigidity of the open bottom part of the tunnel portion 42 in the vehicle width direction.

The dimension W2 of the power receiving coil 22 in the vehicle width direction is set larger than the width dimension W1 of the open bottom part of the tunnel portion 42, so that the power receiving coil 22 is directly joined to the stiffening portions 43 on both sides of the open bottom part. This can further increase the attachment rigidity of the power receiving coil 22 and the rigidity of the tunnel portion 42 in the vehicle width direction.

The motor unit 29U is mounted on the sub-frame 51, which is a frame member arranged in the lower part of the front compartment 1F. At the rear end of the sub-frame 51, the extension portions 53 are provided, which extend from both sides of the power receiving coil 22 in the vehicle width direction toward the back of the vehicle and stiffens the fixed portions of the power receiving coil 22.

The fixed portions of the power receiving coil 22 are thereby stiffened by the extension portions 53. This can increase the attachment rigidity of the power receiving coil 22 against inputted vibration acting on the fixed portions due to vibration at traveling and the like. Moreover, the front side and the right and left sides of the power receiving coil 22 are guarded by the rear end of the sub-frame 51 and the extension portions 53 on both sides thereof, respectively, and the rear side of the power receiving coil 22 is guarded by the battery 27.

Consequently, the power receiving coil 22 can be protected from road interference and the like. It is therefore possible to increase the effect of protecting the aforementioned wire harness 32, which is arranged over the power receiving coil 22.

In the example described in the above embodiment, the dimension W2 of the power receiving coil 22 in the vehicle width direction and the width dimension W1 of the open bottom part of the tunnel portion 42 have a relationship of W1<W2. However, depending on the vehicle specifications, the relationship therebetween may be set to W1>W2. In this case, the power receiving coil 22 may be joined using a bracket so as to be arranged across the open bottom part of the tunnel portion 42.

In the example shown in the aforementioned embodiment, the floor panel 40 is provided with the tunnel portion 42 at the center of the vehicle. However, the other embodiment not described is applicable to a flat floor panel not provided with the tunnel portion 42.

The entire contents of Japanese Patent Application No. 2013-083544 (filed on 12 Apr. 2013) is incorporated herein by reference.

Hereinabove, the present invention is described along the embodiment. However, it is obvious to those skilled in the art that the present invention is not limited to the above description and can be variously modified and improved.

INDUSTRIAL APPLICABILITY

In the present invention, the power receiving portion is mounted at the center in the vehicle width direction, of the front part of the lower surface of the floor panel near the front wheels that are driven. According to the present invention, therefore, the power receiving portion is properly aligned with the power supply portion so as to exactly face the power supply portion on the road with the same feeling as driving to steer and park the vehicle to a predetermined stop position in a parking space so that the center of the vehicle is aligned with the power supply portion.

Moreover, in the present invention, the fixed portions of the power receiving portion are stiffened with the extension portions on the sub-frame. Accordingly, it is possible to increase the attachment rigidity of the coil unit against the inputted vibration acting on the fixed portions due to vibration at traveling. In the present invention, furthermore, the front side and the right and left sides of the power receiving portion are guarded by the rear end of the sub-frame and the extension portions on both sides thereof, respectively, and the rear side of the power receiving portion is guarded by the battery mounted on the lower surface of the floor panel. According to the present invention, it is therefore possible to protect the power receiving portion from road interference and the like, thus increasing the safety.

REFERENCE SIGNS LIST

1 VEHICLE
1F FRONT COMPARTMENT
2 PARKING SPACE
12 POWER TRANSMISSION COIL (POWER SUPPLY PORTION)
22 POWER RECEIVING COIL (POWER RECEIVING PORTION)
27 BATTERY
29U MOTOR UNIT
31, 32, 33, 34 WIRE HARNESS
40 FLOOR PANEL
51 SUB-FRAME
53 EXTENSION PORTION

The invention claimed is:

1. A contactless power supply device, comprising:
a power receiving portion provided at the center in the vehicle width direction, of a front part of the lower surface of a floor panel of a vehicle;
a power supply portion which is provided for a parking space and contactlessly supplies electric power to the vehicle by magnetic connection with the power receiving portion;
a sub-frame provided in a lower part of a front compartment of the vehicle;
a motor unit mounted on the sub-frame; and
extension portions stiffening fixed portions of the power receiving portion, the extension portions including extending parts which are extended from both sides of the rear end of the sub-frame in the vehicle width direction toward the back of the vehicle along both sides of the power receiving portion in the vehicle width direction, located to be faced to and separated from the both sides of power receiving portion in the vehicle width direction, and fixed to the fixed portions so as to have interspaces between the fixed portions and the both sides of power receiving portion in the vehicle width direction.

2. The contactless power supply device according to claim 1,
the extension portions further including columnar base,
the extending parts of the extension portions are fixed to both ends of a base portion extending in the vehicle width direction, and the extension portions are fastened and fixed together with the rear end of the sub-frame.

3. The contactless power supply device according to claim 1, further comprising:
a battery provided on the lower surface of the floor panel; and
a wire harness transmitting electric power from the battery to the motor unit, wherein
the wire harness is arranged to pass over the power receiving portion and extend in the vehicle longitudinal direction.

* * * * *